(12) United States Patent  
Stromberger

(10) Patent No.: US 8,890,660 B2
(45) Date of Patent: Nov. 18, 2014

(54) POWER SAVING METHOD

(75) Inventor: Guenter Stromberger, Lieboch (AT)

(73) Assignee: NXP B.V., Eindhoven (NL)

( * ) Notice: Subject to any disclaimer, the term of this patent is extended or adjusted under 35 U.S.C. 154(b) by 277 days.

(21) Appl. No.: 13/258,325

(22) PCT Filed: Nov. 10, 2009

(86) PCT No.: PCT/IB2009/054983
§ 371 (c)(1),
(2), (4) Date: Nov. 3, 2011

(87) PCT Pub. No.: WO2010/109275
PCT Pub. Date: Sep. 3, 2010

(65) Prior Publication Data
US 2012/0038464 A1 Feb. 16, 2012

(30) Foreign Application Priority Data

Mar. 24, 2009 (EP) ..................................... 09155965

(51) Int. Cl.
*H04Q 5/22* (2006.01)
*H04W 52/02* (2009.01)
*G06F 13/00* (2006.01)

(52) U.S. Cl.
CPC ............ *H04W 52/0283* (2013.01); *Y02B 60/50* (2013.01)
USPC .......................... 340/10.3; 340/10.1; 711/103

(58) Field of Classification Search
USPC ................................. 340/10.3, 10.1; 711/103
See application file for complete search history.

(56) References Cited

U.S. PATENT DOCUMENTS

| 4,691,202 | A | | 9/1987 | Denne et al. |
| 5,675,342 | A | | 10/1997 | Sharpe |
| 5,781,782 | A | * | 7/1998 | Tachikawa ..................... 713/330 |
| 6,173,899 | B1 | | 1/2001 | Rozin |
| 6,404,325 | B1 | | 6/2002 | Heinrich et al. |
| 7,423,517 | B2 | * | 9/2008 | Kofler ........................ 340/10.51 |
| 7,689,172 | B2 | * | 3/2010 | Jakonen et al. .............. 455/63.1 |
| 2003/0097302 | A1 | * | 5/2003 | Overhultz et al. .............. 705/14 |
| 2006/0128348 | A1 | * | 6/2006 | Jang ........................... 455/343.1 |
| 2007/0293209 | A1 | | 12/2007 | O'Toole et al. |
| 2008/0094180 | A1 | * | 4/2008 | Kato et al. ..................... 340/10.3 |
| 2008/0136603 | A1 | * | 6/2008 | Choi et al. .................... 340/10.33 |
| 2009/0045916 | A1 | * | 2/2009 | Nitzan et al. .................. 340/10.1 |
| 2010/0250875 | A1 | * | 9/2010 | Leung et al. .................... 711/155 |

FOREIGN PATENT DOCUMENTS

| CN | 1184990 A | 6/1998 |
| CN | 1612494 A | 5/2005 |
| CN | 1942882 A | 4/2007 |
| CN | 101165712 A | 4/2008 |
| EP | 0 766 215 A | 2/1997 |

OTHER PUBLICATIONS

International Search Report for Int'l Patent Application No. PCT/IB2009/054983 (Dec. 21, 2009).

* cited by examiner

*Primary Examiner* — Jennifer Mehmood
*Assistant Examiner* — Omar Casillashernandez

(57) ABSTRACT

The invention relates to a method for saving power especially for tag talks first data transmission in radio frequency identification (RFID) systems including a tag containing a non-volatile memory, a digital block and an analogue block and a static random access, wherein the data of the non-volatile memory are prefetched from the non-volatile memory into the digital block and the tag talks first data will be stored in the static random access memory embedded in the digital block.

7 Claims, 1 Drawing Sheet

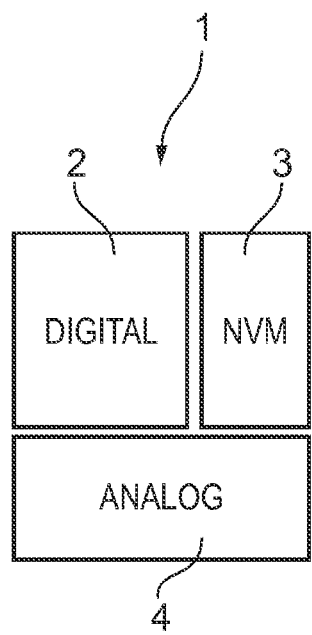
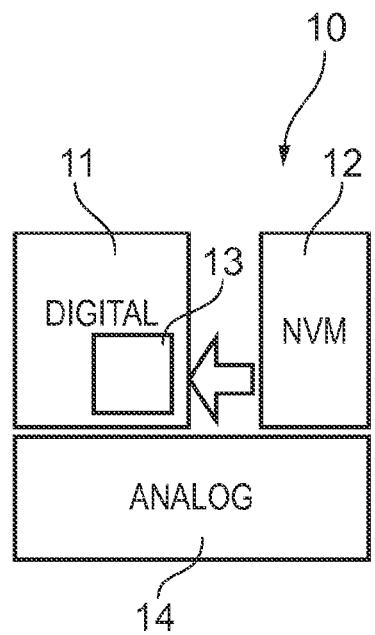
FIG. 1
FIG. 2
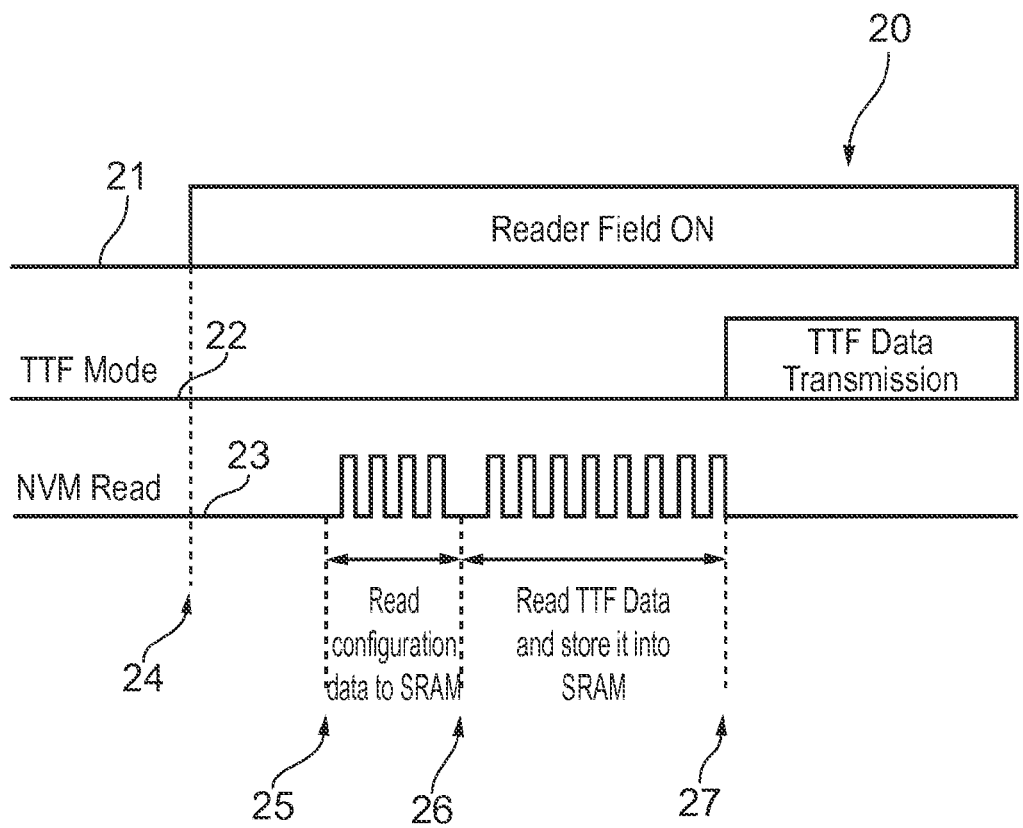
FIG. 3

POWER SAVING METHOD

FIELD OF THE INVENTION

The invention relates to method for saving power especially for tag talks first data transmission in radio frequency identification (RFID) as claimed in claim 1.

BACKGROUND OF THE INVENTION

Radio frequency identification (FRID) is well known in the prior art. One possible process of RFID is the so called tag talks first operation during which the tag sends data first to a receiver or reader. At least at very weak field strengths the chip& of such a RFID system runs out of energy easily during transmission of data from the tag to the reader device. Therefore the operating range of such a system is strongly reduced and therefore the reliability in data communication is strongly reduced what is in general not acceptable by the customers.

OBJECT AND SUMMARY OF THE INVENTION

It is an object of the invention to create a method for saving power especially for tag talks first data transmission in radio frequency identification (RFID) in order to increase communication reliability of such a system and/or to increase operation distance of the system.

The object of the invention will be solved by a method according to the features of claim 1. The inventive method for saving power especially for tag talks first data transmission in radio frequency identification (RFID) systems including a tag containing a non-volatile memory, a digital block and an analogue block and a static random access, wherein the method contains the steps such that the data of the non-volatile memory are prefetched from the non-volatile memory into the digital block and the tag talks first data will be stored in the static random access memory embedded in the digital block to allow switching the non volatile memory into power down mode during tag talks first data transmission.

Furthermore it is of advantage that the non-volatile memory will be put into a power down mode during the tag talks first data transmission.

Additionally it is of advantage that the digital block will be operated at a voltage which is lower than the voltage applied to the non-volatile memory.

Accordingly it is of advantage that at least at the beginning of the inventive method the reader field is switched off and the tag talks first mode is low and the read status of the non-volatile memory is low too.

According to the above method it is of advantage that at a predetermined point in time the reader field will be switched on.

Furthermore it is of advantage that at a further predetermined point in time the system reads chip configuration data and stores it to the static RAM.

Furthermore it is of advantage that at a further predetermined point in time the system reads the tag talks first data from the non volatile memory and stores them into the static RAM.

Furthermore it is of advantage that at a further predetermined point in time and after the reading and storing process has been finished the tag talks first mode will be activated by starting the tag talks first data transmission.

Furthermore it is of advantage that at a further predetermined point in time when the tag switches from power up mode into tag talks first operation, the non-volatile memory can be switched into power down mode.

Furthermore it is of advantage that furthermore the tag talks first data will be provided by the static RAM during reply modulation of the process.

According to another aspect of the invention a RFID tag will be provided such that the RFID tag contains a non-volatile memory, a digital block and an analogue block and a static random access especially for the use of the above described inventive method.

DESCRIPTION OF EMBODIMENTS

The above and other features and advantages of the invention will be apparent from the following description of an exemplary embodiment of the invention with reference to the accompanying drawings, in which:

FIG. 1 shows a schematic view of a RFID tag of the prior art;

FIG. 2 shows a schematic view of an inventive RFID tag; and

FIG. 3 shows a diagram showing the timing behaviour of the proposed inventive solution.

FIG. 1 show schematically a block diagram of radio frequency identification (RFID) tag 1 which contains at least a digital block 2, a non-volatile memory 3 and an analogue block 4.

During tag talks first operation usually high power consumption is needed to keep the performance of the operation of the system. Since the tag 1 reads tag talks first data bit by bit just before transmission to the reader device, this requires a higher operation voltage in order to maintain the correct reading from the non-volatile memory 3. The power consumption of the non-volatile memory 3 which must be powered during the tag talks first operation need a high level of energy and therefore reduces the operational distance of the system.

The situation within which during a high power consumption exists is the situation during data transmission from the tag to the reader device. Since most of the known tags of the prior art are using such techniques which use a modulated magnetic field by putting a load parallel to the chip terminals the chip is not able to receive power during such a modulation phase. Therefore most of the time of operation of the tag the operation distance is limited by power consumption during the modulation phase. Accordingly the non-volatile memory is consuming a high amount of power or energy when having it switched on in such a modulation phase.

FIG. 2 shows a schematic block diagram of the inventive RFID tag 10. The inventive tag contains at least 1 digital block 11, a non-volatile memory 12 an analogue block 14 and an additional static random access memory 13 SRAM. During tag talks first data transmission no operation of the non-volatile memory 3 is basically needed, therefore the data of the non-volatile memory 12 are prefetched from the non-volatile memory 12 into the digital block 11 and the tag talks first data will be stored in the static random access memory 13 embedded in the digital block 11. Accordingly the non-volatile memory can be put into a power down mode during the tag talks first data transmission which leads to a significant reduction of power consumption.

Furthermore the digital block can operate at much lower voltage compared to the non-volatile memory. Additionally this leads to a reduction of power consumption and to an increase of the operating distance in the tag talks first mode.

FIG. 3 shows a diagram 20 in which the upper curve 21 shows the status of the reader field, the curve 22 in the middle of the diagram shows the tag talks first mode (ttf mode) and the lower curve 23 shows the read status of the non-volatile memory. All the curves are shown as a function of time. At the beginning of the shown time window the reader field is switched off and the ttf mode is low and the read status of the non-volatile memory is low too. At time 24 the reader field will be switched on. After a predetermined period of time at time 25 the system starts with sending reader configuration data to the static RAM. This will be done until time 26. From time 26 to time 27 the system reads the tag talks first data and stores them into the static RAM. After this reading and storing process have been finished at time 27 the tag talks first mode will be activated by starting the tag talks first data transmission.

Therefore it is the object of the invention to reduce power consumption. This will be achieved since the data from the tag talks first operation will be fetched from the non-volatile memory during power up. When the tag switches from power up mode into tag talks first operation, the non-volatile memory can be switched into power down mode, see e.g. at time 27, and the tag talks first data will be provided by the static RAM during reply modulation of the process.

REFERENCES

1 RFID tag
2 digital block
3 non-volatile memory
4 analogue block
10 RFID block
11 digital block
12 non-volatile memory
13 static random access memory (static RAM)
14 analogue block
20 diagram
21 upper curve
22 middle curve
23 lower curve
24 time
25 time
26 time
27 time

The invention claimed is:

1. Method for saving power for tag talks first data transmission in a radio frequency identification system including a tag containing a non-volatile memory, a digital block and an analogue block and a static random access memory (RAM), wherein tag talks first data of the non-volatile memory are prefetched from the non-volatile memory into the digital block and the tag talks first data is stored in the static random access memory embedded in the digital block and the non volatile memory is switched into power down mode during transmission of the tag talks first data;
    wherein the digital block is operated at a voltage which is lower than the voltage applied to the non-volatile memory during transmission of the tag talks first data;
    wherein at least at the beginning a reader field is switched off and a tag talks first mode is low and a read status of the non-volatile memory is low;
    wherein at a predetermined point in time the reader field is switched on; and
    wherein prefetching tag talks first data from the non-volatile memory is triggered by the switching on of the reader field.

2. Method according to claim 1, wherein furthermore the tag talks first data will be provided by the static RAM during reply modulation of the process.

3. RFID tag containing the non-volatile memory, the digital block and the analogue block and the static random access memory according to claim 1.

4. A method for saving power for tag talks first data transmission in a radio frequency identification system including a tag containing a non-volatile memory, a digital block having a static random access memory (RAM), and an analogue block, the method comprising:
    prefetching tag talks first data from the non-volatile memory and storing the prefetched tag talks first data into the static RAM of the digital block, wherein prefetching tag talks first data from the non-volatile memory is triggered by the switching on of a reader field;
    transmitting the prefetched tag talks first data from the static RAM of the radio frequency identification system;
    putting the non-volatile memory into a power down mode during transmission of the prefetched tag talks first data; and
    further comprising operating the digital block at a voltage which is lower than the voltage applied to the non-volatile memory during transmission of the prefetched tag talks first data.

5. The method of claim 4, wherein chip configuration data is prefetched from the non-volatile memory along with the tag talks first data.

6. The method of claim 4, further comprising providing the tag talks first data from the static RAM during a reply modulation process.

7. A radio frequency identification (RFID) tag comprising:
    an analogue block;
    a non-volatile memory that stores tag talks first data; and
    a digital block having a static random access memory (RAM);
    wherein the RFID tag is configured to:
        prefetch the tag talks first data from the non-volatile memory and store the prefetched tag talks first data into the static RAM of the digital block, wherein prefetching tag talks first data from the non-volatile memory is triggered by the switching on of a reader field;
        transmit the prefetched tag talks first data from the analogue block of the RFID tag; and
        put the non-volatile memory into a power down mode during transmission of the prefetched tag talks first data; and
        operate the digital block at a voltage which is lower than the voltage applied to the non-volatile memory during transmission of the prefetched tag talks first data.

* * * * *